Patented Feb. 10, 1931

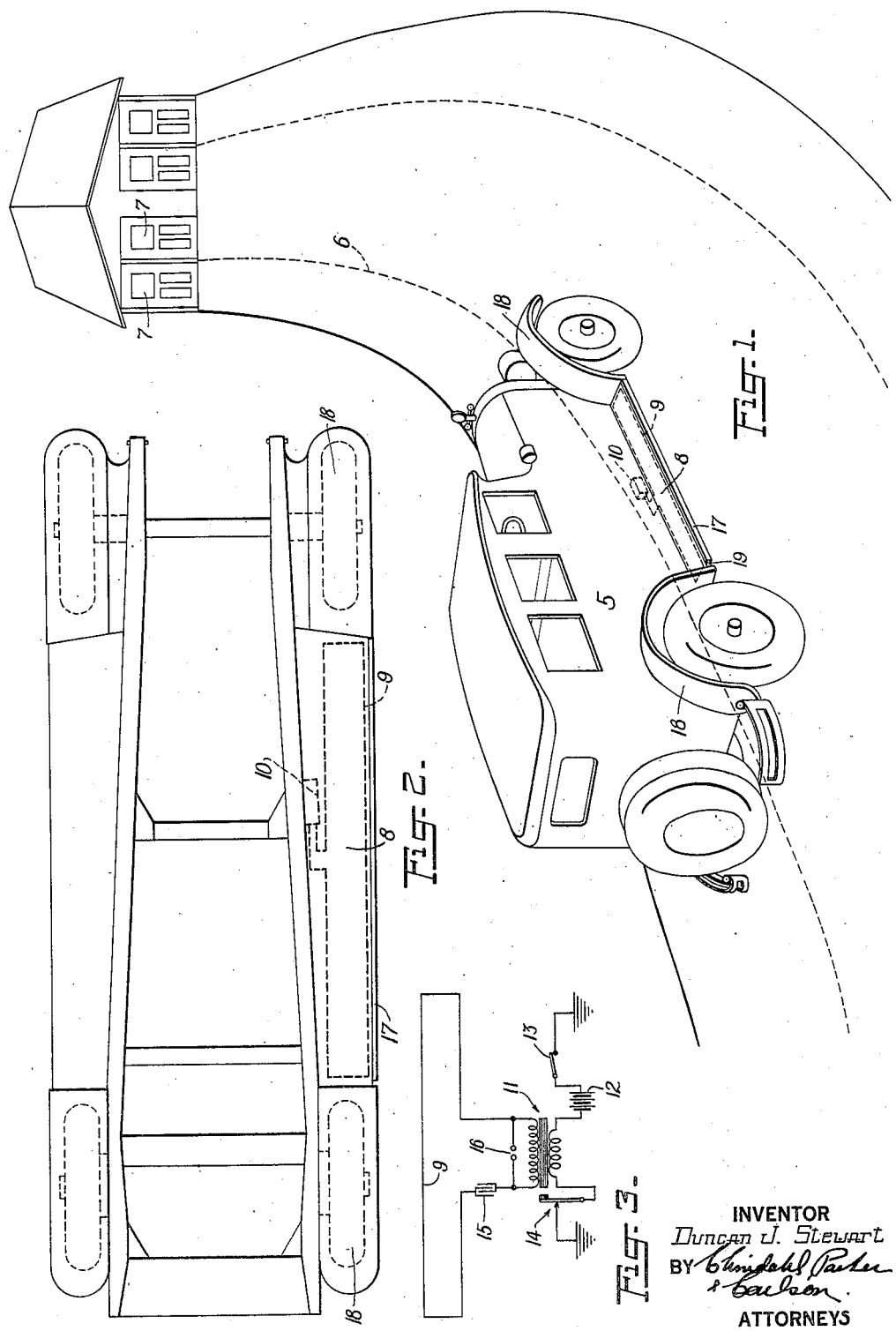

1,792,194

UNITED STATES PATENT OFFICE

DUNCAN J. STEWART, OF ROCKFORD, ILLINOIS, ASSIGNOR TO HOWARD D. COLMAN, OF ROCKFORD, ILLINOIS

TRANSMITTING ANTENNA

Application filed June 6, 1927. Serial No. 196,711.

This invention relates to antennæ for transmitting radiant energy and more particularly to an antenna on a moving object, such as a motor vehicle.

In a copending application by Howard D. Colman, Serial No. 175,377, filed March 14, 1927, there is disclosed a radiant energy signalling system for selectively controlling a power-driven garage door operator by signal combinations transmitted from a motor vehicle. The transmitting antenna of this system is carried by the motor vehicle while the receiving antenna preferably extends along the driveway leading to the garage building and is connected with a simple vacuum-tube receiving circuit for controlling a selective mechanism which is adapted to start the driving unit of a door operator upon the reception of a predetermined combination of signal impulses and space units.

In such a system, the two antennæ can be brought into relatively close association during signalling, and therefore the electromagnetic field as distinguished from the so-called electrostatic and radiation fields, all of which fields exist about or emanate from a transmitting antenna, may be utilized to control the selector, it being a known fact that the electromagnetic field is very strong in the vicinity of an antenna but that the strength of the field decreases rapidly as the distance from the antenna increases. On account of this close association of the antennæ, a low power transmitter may be used which will not materially affect the radio receiving sets in the neighborhood, and yet the detector circuit used may be simple and rugged in construction.

In the system above mentioned, the antenna should be mounted on the vehicle so that it will not disfigure the vehicle or interfere with its operation; so that it may be easily installed; and so that it will not be disturbed in the ordinary use of the vehicle, that is, it should be protected mechanically by the parts of the vehicle. To meet these requirements, it is desirable to place the antenna beneath the body structure of the vehicle. But it has been found that for most positions where a transmitting antenna can be mounted in such close association with the metallic structure as to be adequately protected from injury, the signals transmitted therefrom are relatively weak.

The primary object of the present invention is to provide a transmitting antenna on a motor vehicle which meets the above requirements as to location and installation and which at the same time is capable of producing signals of such strength as to insure the operation of receiving mechanism with a simple detector circuit.

Another object is to provide a mounting for a transmitting antenna which is particularly applicable to motor vehicles having running boards made of wood or other non-metallic material.

Other objects and advantages of the invention will become apparent from the following description taken in connection with the accompanying drawings in which:

Figure 1 is a view of a motor vehicle and a garage showing transmitting and receiving antennæ associated therewith.

Fig. 2 is a plan view of the chassis of a motor vehicle showing more in detail the manner in which the transmitting antenna is mounted thereon.

Fig. 3 is a wiring diagram showing a suitable transmitting circuit.

While I have illustrated the preferred embodiment of my invention, it is to be understood that various modifications may be made without departing from the spirit and scope of the invention as expressed in the appended claims.

The invention is illustrated in the drawings as applied to a motor vehicle 5 for transmitting electromagnetic fields of radiant energy for detection by a receiving antenna 6 to initiate the operation of a power operator for the doors 7, of a garage building so that the vehicle may enter or leave the garage. Herein the receiving antenna comprises a single wire embedded in the surface of the driveway and connected to a vacuum-tube detector circuit (not shown).

The body structure of the vehicle shown herein includes a so-called wooden running board 8 in or under which the transmitting antenna may be mounted. In the present instance this antenna comprises a wire 9 arranged in the form of a rectangularly-shaped loop to form a closed circuit and secured against the under side of the running board and therefore is insulated from the metallic frame and body structure of the vehicle. Preferably, the medial portion of the wire is secured near the outer edge of the running board while the end portions extend along the inner edge and are connected to a transmitter unit 10 mounted on the vehicle frame. This unit is adapted to produce an alternating current in the loop whereby to produce a strong electromagnetic field in the space surrounding the loop. A suitable transmitting unit for this purpose is shown diagrammatically in Fig. 3 as comprising an induction coil 11, the primary of which includes a battery 12, a control switch 13, and the usual interrupter 14. The antenna circuit includes the loop 9 and the usual condenser 15 and spark gap 16. One plate of the condenser is connected to the loop while the other plate is connected to the spark gap, the latter being connected to the other end of the loop. The secondary of the induction coil is connected in parallel with the spark gap. When the switch 13 is closed, the spark coil operates in a well-known manner to cause a damped alternating current to flow in the circuit including the loop, the condenser and the spark gap, the frequency being determined by the circuit itself. The changing current in the loop creates a varying electromagnetic field. If a portion of the receiving antenna circuit is linked with flux due to the magnetic field about the antenna, an electromotive force will be created therein by mutual induction, and the voltages thus induced may be detected by the circuit connected to the receiving antenna.

The theoretical magnitude of the voltage induced in the receiving antenna is proportional to the time rate of change of the flux created by the currents in the transmitting loop which flux links with the receiving antenna. This rate of change of flux is in turn dependent upon the frequency of oscillation of the current in the transmitting loop, which frequency is determined by the transmitting circuit and is substantially constant. The rate of change of flux is also dependent upon the total flux linking with the receiving circuit for any given position of the vehicle with respect to the receiving antenna. The total flux is equal to the surface integral of the flux density taken over the surface enclosed by the receiving circuit. Therefore for any position of the vehicle relative to the receiving antenna, the strength of the impulses produced in the antenna and affecting the detector tube in the receiving circuit is determined by the frequency of the current alternating in the loop and also by the surface integral of the flux density over the surface bounded by the receiving antenna circuit. The flux density is substantially proportional to the current in the transmitting antenna.

While it is theoretically possible from the above considerations to compute the voltage induced in a receiving antenna due to the flux produced by a given current in a transmitting antenna, such computation is rendered practically impossible when the transmitting antenna is mounted on a motor vehicle as in the present instance. The problem of producing a strong electromagnetic field for detection by the receiving circuit is thus complicated by the practical necessity for closely associating the transmitting loop with the metallic frame, body and other parts of the vehicle, the effect of which is to reduce the total flux linking with the receiving antenna thereby causing weak signals. This effect may be considered as being due to the existence of what may be called secondary inductive circuits formed by the metallic parts of the vehicle and linking with part of the flux produced by the transmitting loop. Thus, when a current changes in the loop antenna, which constitutes a primary circuit, currents are induced in any adjacent secondary circuit with which the flux of the primary circuit links. The magnitude of this current depends upon the total flux linking with the secondary circuit and also upon the impedance of the secondary circuit. The currents in the secondary circuits in general flow in paths adjacent to and in directions opposite to the current in the primary circuit. The flux, due to the secondary currents, which links with the receiving antenna is therefore opposed to the flux due to the primary circuit. Since the reactance of the primary circuit is practically zero, the secondary currents cannot decrease the impedance in the primary and therefore the current in the primary cannot be increased to compensate for the secondary currents. The resultant effect of the existence of the metal parts of the vehicle adjacent the transmitting loop is to weaken the electromagnetic fields which constitute the signals in the present system.

In order to minimize the effect above described, the loop is positioned as far distant from the vehicle body structure as is possible and still have the loop protected from mechanical injury, that is, in or under the running board. In this position, the inductive effect of the metal body and frame does not materially weaken the signals since the secondary circuits formed thereby link with only a part of the flux produced by the transmitting antenna. Thus, in the case of vehicles which do not have a metal strip or other metallic part extending along the outer edge of its running boards, signals of the desired strength can be obtained with the loop mounted as above described.

The majority of vehicles, however, having wooden running boards are equipped with a metal strip 17 extending along the outer edge of the board and attached at its opposite ends to the front and rear fenders 18. When the transmitting loop is mounted under such a running board, the induction fields about the loop are relatively weak. This may be attributed to the fact that the metal strip forms with the metallic parts of the vehicle a secondary circuit which is positioned parallel to and substantially concentrically with respect to the transmitting loop. In such a position the circuit links with practically the entire flux produced by the antenna. I have found that this condition may be obviated by breaking the metallic strip 17 as indicated at 19 in Fig. 1, thereby electrically disconnecting one end of the strip from the parts of the vehicle with which the strip would otherwise form a secondary circuit in such a decidedly unfavorable position. With the inductive effect of this particular secondary circuit eliminated, satisfactory voltages may be produced in the receiving antenna from a transmitting loop positioned beneath the vehicle running board.

With the transmitting antenna mounted as above described, it has been found that the receiving circuit may be operated properly even when the vehicle is positioned at considerable distance from the receiving antenna. The loop is mounted in an out-of-the way position where it is not apt to be displaced or interfered with under normal operation conditions. Furthermore, since the electrostatic and radiation fields emanating from such a transmitting antenna are almost negligible, radio receiving sets located at any considerable distance from the loop will not be affected materially.

I claim as my invention:

1. The combination with a vehicle having a running-board formed of non-metallic material with a metallic strip extending along its outer edge, of a transmitting antenna comprising a wire arranged on the under side of said running-board in the form of a loop, the circuit normally completed by said strip and the metallic structure of said vehicle being broken to eliminate the inductive effect of such circuit.

2. The combination with a motor vehicle having an elongated non-metallic running-board disposed in a substantially horizontal plane, of a transmitting antenna comprising a conductor carried by the running-board substantially in the plane thereof and arranged to form an elongated loop extending longitudinally of said board and constituting the sole metallic loop circuit in or near the plane of the running-board.

In testimony whereof, I have hereunto affixed my signature.

DUNCAN J. STEWART.